(No Model.)
J. J. BILLINGSLEY.
CAR WHEEL.
No. 349,977. Patented Sept. 28, 1886.
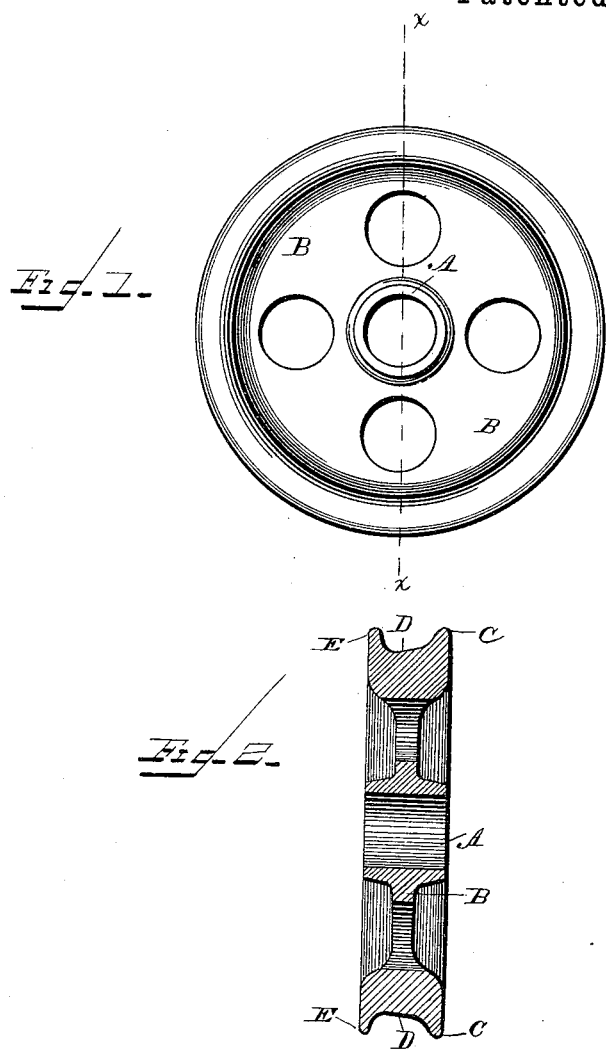
WITNESSES
INVENTOR
James J. Billingsley
Frank A. Fouts,
Attorney

UNITED STATES PATENT OFFICE.

JAMES J. BILLINGSLEY, OF MINDEN, LOUISIANA.

CAR-WHEEL.

SPECIFICATION forming part of Letters Patent No. 349,977, dated September 28, 1886.

Application filed January 4, 1886. Serial No. 187,612. (No model.)

*To all whom it may concern:*

Be it known that I, JAMES J. BILLINGSLEY, a citizen of the United States, residing at Minden, in the parish of Webster, State of Louisiana, have invented certain new and useful Improvements in Railroad Locomotive and Car Wheels, of which the following is a specification, reference being had therein to the accompanying drawings.

My invention relates to locomotive and car wheels; and it consists in providing the ordinary car-wheel with an outside supplementary flange.

The object of my invention is to keep the wheels and truck on the course in the event of a broken rail or other defect in the track, all of which will be more fully hereinafter explained, and pointed out in the claim.

In the accompanying drawings, Figure 1 represents a side view of a wheel provided with my improvement. Fig. 2 is a section taken on the line $x\ x$ of Fig. 1.

Like letters refer to like parts throughout the several views.

A indicates the hub of the wheel, and B the web.

C represents the inside or ordinary flange, and D the tread, having an inclination to the axis of the wheel.

E indicates the outside supplementary flange, extending above the faces of the tread, which is cast with the wheel. The flange C is intended to run on the inside of the rail and the supplementary flange E on the outside—that is to say, the flanges straddle the rail. The flanges curve inwardly toward the tread, which is inclined, as usual, as will be seen in Fig. 2 of the drawings.

A train equipped with my improvement would not be derailed by encountering a broken or misplaced rail. Should a rail be broken on one side, the outside supplementary flange on the opposite wheel would hold the good rail and keep the truck on its course. The effect would be the same, no matter on which side the rail is broken.

In another application I illustrate and claim a frog to be used in connection with the improved wheel herein shown.

I am aware that flanges have been heretofore formed on a wheel having two treads. I am also aware that a flange has been cast between the tread of a wheel having two treads. These I do not seek to claim.

Having thus described my invention, I claim as new and desire to secure by Letters Patent of the United States—

A car-wheel having flanges E C arranged on opposite sides of the periphery of a single inclined tread, the whole cast in one piece, as shown and described.

In testimony whereof I affix my signature in presence of two witnesses.

JAMES J. BILLINGSLEY.

Witnesses:
T. M. FORT,
GENT E. BAILEY.